March 1, 1966  B. E. MURPHY  3,237,390
ENDLESS BELT SIDE DELIVERY RAKE
Filed Jan. 4, 1963  3 Sheets-Sheet 1

Bynum E. Murphy
INVENTOR.

March 1, 1966 B. E. MURPHY 3,237,390
ENDLESS BELT SIDE DELIVERY RAKE
Filed Jan. 4, 1963 3 Sheets-Sheet 2
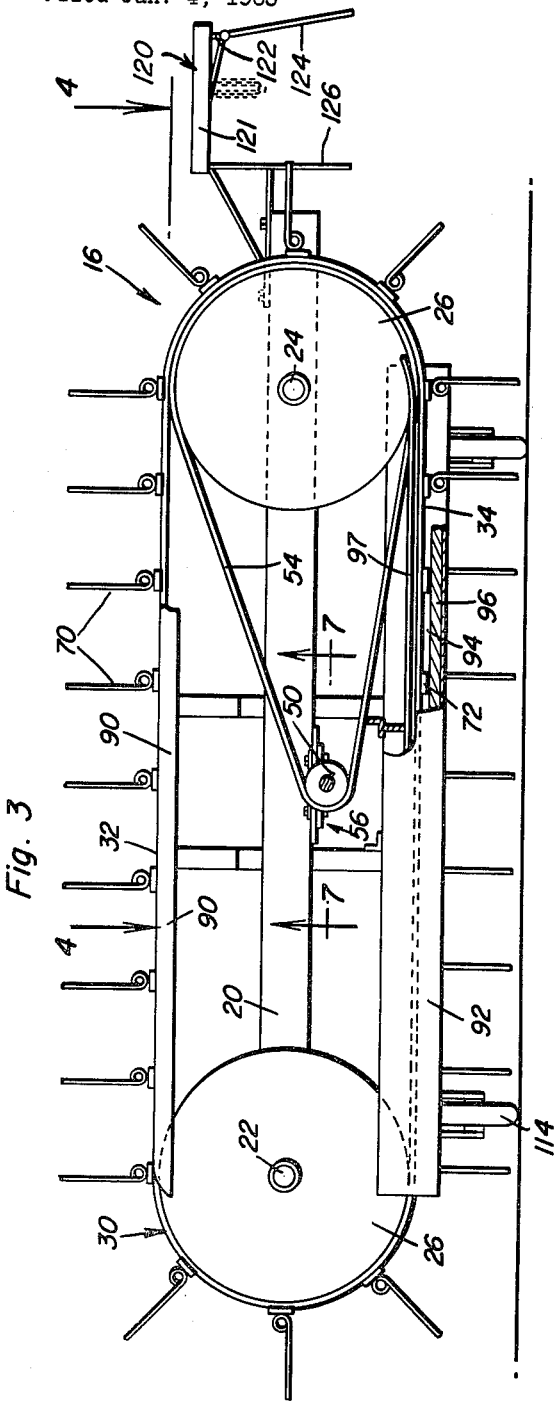
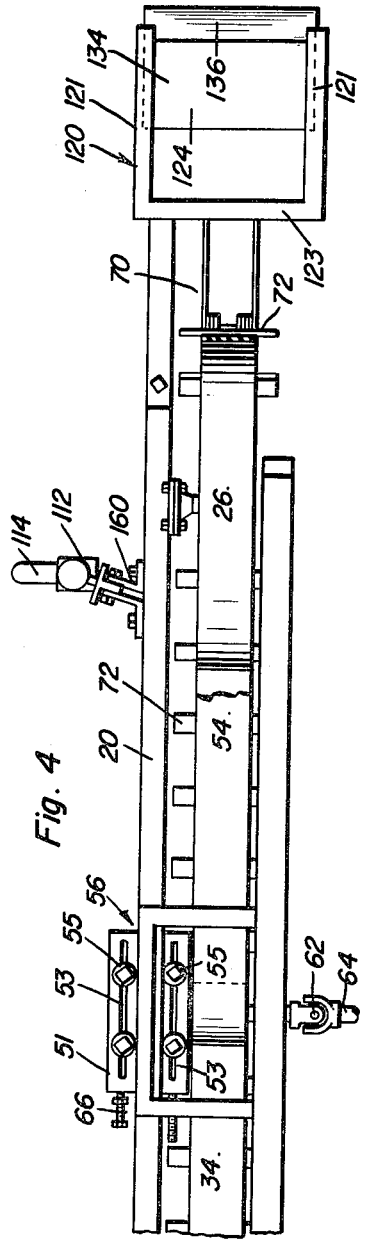
Bynum E. Murphy
INVENTOR.

March 1, 1966  B. E. MURPHY  3,237,390
ENDLESS BELT SIDE DELIVERY RAKE
Filed Jan. 4, 1963  3 Sheets-Sheet 3
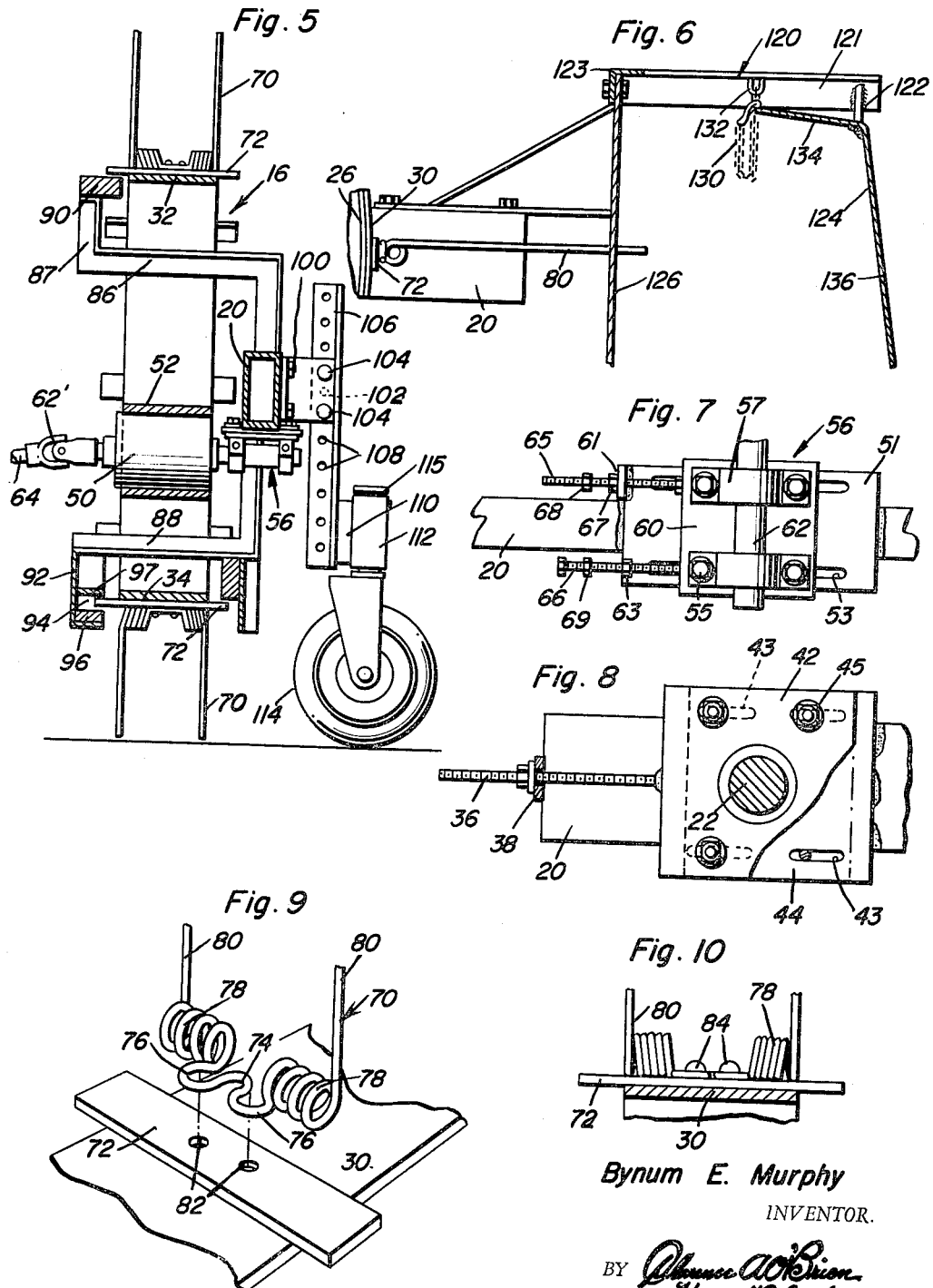
Bynum E. Murphy
INVENTOR.

United States Patent Office 3,237,390
Patented Mar. 1, 1966

3,237,390
ENDLESS BELT SIDE DELIVERY RAKE
Bynum E. Murphy, Minden, La., assignor to Anderson-Dunham, Inc., doing business as Dunham Manufacturing Company, Minden, La., a corporation of Louisiana
Filed Jan. 4, 1963, Ser. No. 249,371
12 Claims. (Cl. 56—376)

This invention comprises a novel and useful endless belt side delivery rake and more particularly pertains to a power operated belt-type side delivery rake attachment especially adapted for use with farm tractors and the like in order to effect windrowing of crops in an improved manner.

It is the primary object of this invention to provide an improved power driven belt type of side delivery rake.

A further object of the invention is to provide a rake which is especially adapted to be mounted as an attachment upon a farm tractor whereby the rake may be powered, transported and lifted and lowered by elements of the conventional tractor.

A further object of the invention is to provide a side delivery rake having an improved endless belt construction provided with rake teeth thereon and disposed in horizontally extending flights positioned transversely of the path of travel of the rake together with means for guiding and rigidifying the belt during the operation against vertical deflection.

A further object of the invention is to provide a side delivery rake in accordance with the preceding objects which shall include means effecting the positioning of the lower flight of the rake belt at a predetermined but adjustable constant elevation above the ground.

Yet another object of the invention is to provide a belt-type of side delivery rake which may be economically manufactured and which shall permit the use of conventional automobile wheels having pneumatic tires thereon as a means for supporting and driving the endless belt.

Yet another object of the invention is to provide a side delivery rake in accordance with the preceding objects which shall include an improved means for automatically stripping vegetation from the teeth of the rake during the travel of the endless belt thereby increasing the efficiency of the raking operation.

An additional important object of the invention is to provide a rake construction in accordance with the preceding objects which shall include means for expeditiously tensioning the belt for taking up wear therein and for tensioning the drive means of the belt as may be desired.

A still further object of the invention is to provide an endless belt side delivery rake having improved power operated drive means therefor whereby the drive means and the endless belt are both engaged upon a common support wheel of the belt.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a view in vertical longitudinal section taken upon an enlarged scale substantially upon the plane indicated by the section line 3—3 of FIGURE 1 and showing certain details of the mounting and driving of the endless belt and its rake elements;

FIGURE 4 is a horizontal sectional view taken substantially upon a plane indicated by the section line 4—4 of FIGURE 3 with parts broken away and showing further details of the mounting and drive of the endless belt;

FIGURE 5 is a view in vertical transverse section through a portion of the endless belt assembly and showing the driving, the belt guiding means and the vertical adjusting means thereof;

FIGURE 6 is a fragmentary detail view showing the belt stripping and shield means of the invention and is taken in vertical longitudinal section substantially upon the plane of the section line 6—6 of FIGURE 1;

FIGURE 7 is a further detail view in horizontal section taken substantially upon the plane of the section line 7—7 of FIGURE 3 and showing the means for adjusting the belt drive means;

FIGURE 8 is a detail view in vertical longitudinal section of the belt tension adjusting means and is taken substantially upon the plane of the section line 8—8 of FIGURE 1;

FIGURE 9 is an exploded perspective view of the rake tooth, and the guide and support bar of the belt upon which the rake tooth is mounted; and FIGURE 10 is a detail view in vertical transverse section through a portion of the belt and showing the mounting of a rake tooth element thereon.

Figure 1:
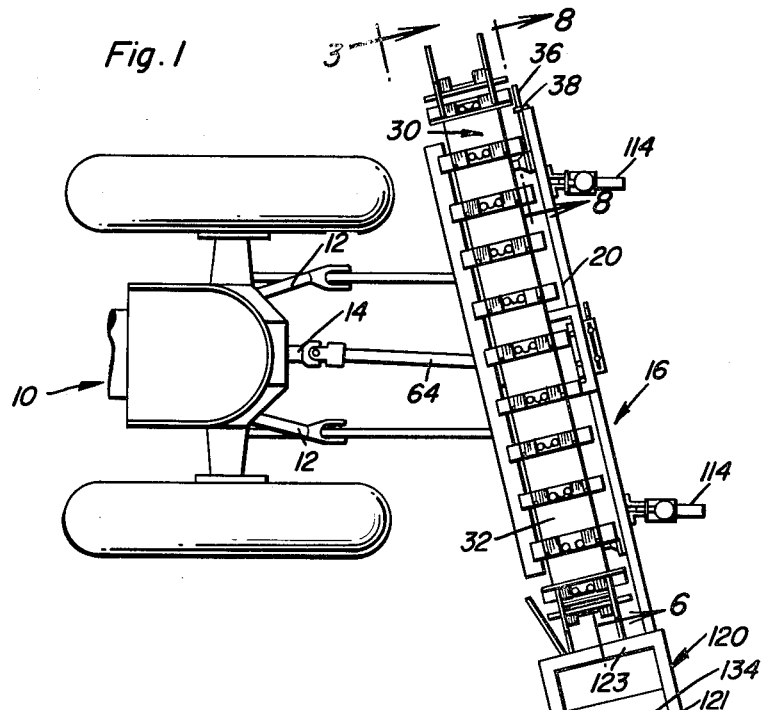
FIGURE 1 is a top plan view of the rear portion of a conventional farm tractor having the belt rake of this invention applied thereto as an attachment.
Figure 2:
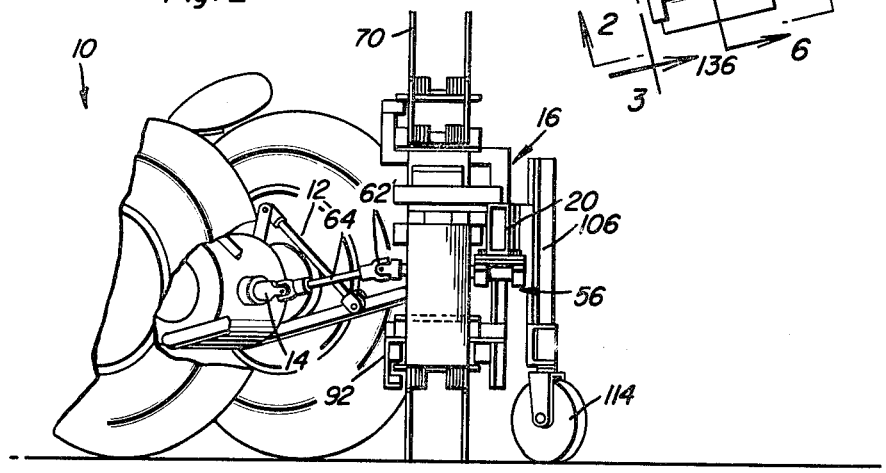
FIGURE 2 is a side elevational view of the arrangement of FIGURE 1 and taken substantially upon the plane indicated by the section line 2—2 of FIGURE 1 parts of the trailer being omitted.

In FIGURES 1 and 2 of the accompanying drawings, the numeral 10 indicates the rear portion of a conventional farm tractor of any conventional type which tractor includes the power operated implement lift arms 12 and a power takeoff element 14. It is with these last-mentioned elements that the side delivery endless belt rake assembly indicated generally by the numeral 16 is detachably connected in order that it may be transported, supplied with power and vertically lifted and lowered through these elements of the tractor.

For a consideration of the structure of the endless belt side delivery rake which forms the subject matter of the invention set forth in claims hereinafter, attention is now directed first to FIGURES 1-3. The side delivery rake assembly 16 includes a support frame including a horizontally extending beam 20 of any suitable material and configuration. Journaled upon the beam by a pair of laterally projecting horizontal stub axles or trunnions 22 and 24 are a pair of support wheels each indicated by the numeral 26. In accordance with this invention these wheels may conveniently consist of automobile wheels having pneumatic tires thereon. An endless belt 30 is entrained about these wheels so as to provide horizontally disposed upper and lower flights indicated generally by the numerals 32 and 34, respectively. The frame is suitably secured to the implement lift arms 12 in order that the entire rake assembly may be raised or lowered by the power operated implement lift of the tractor, with the unit being disposed transversely of the tractor, at the rear thereof, and in a position which is slightly inclined with respect to the longitudinal path of travel of the tractor as shown in FIGURE 1.

In order to compensate for wear developing in the belt to maintain the proper tension thereon, a conventional type of belt or pulley slack takeup is provided. As shown best in FIGURE 8 this may consist of an adjusting screw 36 threadedly engaged through an apertured flange or an end portion 38 projecting laterally of the frame member 20 and which is welded or otherwise fixedly secured to plate 42 which is slidably connected to a fixed plate 44 welded to the vertical face of the frame member 20. The plate 44 projects laterally beyond the top and bottom edges of the beam 20 and has horizontally elongated adjusting slots 43 for the reception of guiding and locking bolts 45 whereby to secure the plate 42 in adjusted position on the plate 44. The axle plate 42 in turn supports the end of the stud axle or shaft 22 so as to move this axle toward or from the other axle 24 and thereby vary the tension of the belt in a manner well understood in this art.

In order to impart power to the belt there is provided a drive means which is connected to the power take-off 14 of the tractor. This drive means includes a drive roller 50 which may be provided with a rubber or other resilient frictional sleeve 52 thereon for engagement with a belt 54. The drive roller is journaled in an adjustable journal bearing assembly 56.

Referring to FIGURES 4 and 7, it will be seen that the drive roller bearing assembly 56 comprises a horizontal mounting plate 51 which is welded or otherwise rigidly secured to the bottom face of the beam 20 and projects laterally both forwardly and rearwardly therefrom. The projecting marginal portions of the mounting plate are provided with longitudinally extending adjusting slots 53 in which are received fastening bolts 55. The bolts simultaneously secure pillow blocks 57 to the bearing slide plate 60 and the latter adjustably to the mounting plate 51. The drive roller 50 has a shaft or trunnion portion 62 which is journalled in the pillow blocks 57.

Adjustment of the bearing slide plate 60 longitudinally of the beam 20 to adjust the driving roller 50 relative to the belt 54 is effected by the following structure. Depending from the underside of the mounting plate 51 is an apertured lug 61 and an apertured and internally threaded lug or nut 63. Adjusting members 65 and 66 are received through these lugs and cooperate with the slide plate 60.

The member 65 is externally threaded but is loosely slidable through its lug 61 and is welded or rigidly secured to the side plate 60, having an adjusting nut 67 and a lock nut 68. The member 66 is a bolt having a lock nut 69 and abuttingly engages the slide plate 60. The adjusting members 65, 66 effect positive but reverse adjusting sliding movement of the plate 60 for tightening or loosening the driving belt 54.

By means of the universal joint 62' the drive roller 50 is connected to a drive shaft 64 which as shown in FIGURES 1 and 2 is connected to the power takeoff 14.

It is an important feature of this invention that the drive belt 54 shall be entrained over the support wheel 26 of the stub axle 24 and it will be noted that the endless belt 30 is likewise entrained over the same support wheel and over the driving belt. There is thus provided a very simple construction for transmitting power to the rake belt.

Turning now particularly to FIGURES 5, 9 and 10, it will be noted that the belt 30 has a plurality of rake teeth 70 disposed in longitudinally spaced relation along its length. It will also be noted that a plurality of transversely extending bars 72 comprising both support bars and guide bars are provided, one for each rake tooth, and which are attached to the belt upon the exterior surface thereof. As will be noted, the ends of the bars project beyond the edges of the belt for a purpose to be subsequently set forth.

As shown in FIGURES 9 and 10, each of the rake teeth 70 is of a spring-wire construction consisting of a single wire or rod-like element providing a central portion 74 having a pair of anchoring loops 76 therein together with a pair of coils 78 from which project the terminal portions 80 comprising the prongs of the rake tooth. The support bars 72 are provided with a pair of apertures as at 82 for the reception of conventional fasteners such as rivets or bolts 84 which extend through the loops 76 and thus serve to secure the rake teeth 70 to the support bar 72 and the latter to the belt.

Guide means are provided for imparting additional rigidity to the belt and a resistance against lateral deflection during its operation. For this purpose, as will be best seen from FIGURE 5, there are provided suitable upper and lower transverse supports 86 and 88 secured to the support frame of the rake assembly and which are disposed above and below the frame beam 20. The upper support 86 is Z-shaped and its vertical upper arm 87 supports a horizontally extending side rail 90 which extends between but along side of the two support wheels 26 at their upper peripheries and is so positioned that the overlying edges of the support bar 72 on the upper plate 74 will slidably pass across the top thereof to thus support, prevent downward deflection of and rigidify the upper flight 32 of the belt. Depending from the lower member 88 is a plate 92 having a U-shaped channel 94 therein. At the bottom of this channel there is provided a rail 96 which like the rail 90 is of a material less wear resistance than that of the support bars 72. It will be observed that the channel 94 is so disposed that the ends of the support bars of the lower flight 34 will ride in this channel as a guide and support means thus imparting rigidity to and preventing downward deflection of the lower flight 34 of the belt during its raking operation. The upper wall 97 of this channel will prevent upward deflection of the bars 72 and of the lower flight 34 of the belt. Thus, any load imparted to the teeth of the lower flight of the belt will be transmitted directly to the frame through the guide channel 94 thus reducing wear upon the belt itself.

At convenient locations along the longitudinal extent of the device there are provided adjustable gauging and support wheels. Thus, pairs of parallel rearwardly projecting brackets 100 are secured as by welding or in any suitable manner to what may be termed the rear side of the beam 20 and are provided with a vertically spaced series of apertures 102. Secured as by bolts 104 to the mounting brackets are vertically extending L-shaped standards 106 having vertically spaced apertures 108 which are adapted to be selectively engaged by the bolts 104 to selected apertures 102. At their lower ends the standards 106 have short rearwardly projecting horizontal legs 110 having a vertically extending cylindrical sleeve 112 welded thereto, provided with caster wheels 114. Caster wheel spindles 115 are journaled in the hollow sleeves 112. This provides a means for vertically adjusting the attitude and the altitude of the rake belt with respect to the ground.

Referring now especially to FIGURES 3, 4 and 6, it will be observed that there is an endwardly projecting bracket or extension 120 on the frame member 20. By means of a depending hinge bracket 122 there is mounted a depending L-shaped shield, baffle or deflector plate 124 which serves to prevent vegetation carried by the teeth rotating rake being thrown horizontally or laterally therefrom. As seen in FIGURES 1 and 4, the bracket 120 comprises a U-shaped support having a pair of parallel legs 121 carrying the hinge brackets 122 and beneath which is pivoted thereby the adjustable baffle 124. A cross member 123 rigidly connects the inner ends of the legs 121. Depending from the cross member 123 is a downwardly directed, fixed stripper plate 126. The latter, as shown best in FIGURE 6, is of such size as to pass between the two end tines 80 of each rake tooth so as to thereby strip vegetation therefrom thus cleaning the rake teeth and contributing toward the efficiency of operation of the apparatus.

As will be noted from FIGURE 6, a chain 130 or other adjustable fastener is provided, secured to the horizontal or actuating blades 134 of the baffle 124 and adjustably fastened to the hooks 132 for angularly adjustably inclining the vertical blade 136 of the deflector. This permits easy adjustment of the windrowing operation of the stripper.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power driven side delivery rake comprising a support frame, an endless conveyor, support means mounting said conveyor for rotation on said frame, drive means for rotating said conveyor, a plurality of rake teeth mounted upon said conveyor in longitudinally spaced relation thereon, said conveyor including a belt, bars secured to said belt at longitudinally spaced positions upon its outer surface, said rake teeth being each secured to one of said bars, and a guide means on said frame, said support bars having one end of each engageable with said guide means.

2. The combination of claim 1 including wear surfaces on said guide means of a relatively less wear resistant material than that of said bars.

3. A power driven belt type side delivery rake comprising a support frame, means for mounting said support frame upon a supporting vehicle in vertically adjustable position above the ground, support wheels journaled on said frame, an endless belt entrained over said wheels for travel in a direction which is transverse the direction of movement of a supporting vehicle, a drive roller journaled on said frame and adapted to be connected to a source of power, a connecting means for said drive roller and one of said support wheels, a plurality of rake teeth secured in longitudinally spaced positions upon the outer surface of said belt, guide means cooperating with said belt and frame for transmitting deflecting forces from the former to the latter.

4. The combination of claim 3 wherein said connecting means comprises a belt entrained about said roller and said one support wheel and beneath said endless belt.

5. The combination of claim 3 wherein said drive roller is journaled on said frame, means for adjusting said drive roller on said frame toward and from said one support wheel.

6. The combination of claim 3 including a stripper plate mounted on said frame and disposed in the path of travel of said rake teeth for stripping vegetation therefrom and a shield disposed adjacent said stripper plate.

7. In a side delivery hay rake, a supporting frame, conveyor means for moving hay laterally of the frame, said conveying means including a plurality of rake teeth, stripping means carried by said frame and disposed in the path of travel of the rake teeth for stripping hay therefrom, and a depending baffle plate carried by the frame in adjacent relation to the stripper means and depending generally in a vertical position for preventing wide distribution of the hay stripped from the teeth, said shield being pivotally mounted for movement to an inoperative position whereby wet hay may be scattered to speed up the drying time.

8. The structure as defined in claim 7 wherein said teeth are arranged in spaced pairs, said stripping means including a plate which extends into the space between the pair of teeth for stripping all of the hay therefrom.

9. In a side delivery rake comprising a frame, a conveyor belt mounted on said frame and including teeth secured to the belt, said belt having a lower horizontal run, said teeth being in the form of spring tines, a plurality of cross bars carried by said belt with said tines being mounted on the cross bars, said cross bars having at least the forward end thereof projecting beyond the edge of the belt, and guide means along the forward edge of the lower run of the belt for engaging and guiding the movement of the projecting ends of the cross bars thereby preventing twisting of the belt in the lower run thereof during the raking operation.

10. The structure as defined in claim 9 wherein said bars also project beyond the rear edge of the belt, and guide means along the rear edge of the belt to engage and guide the rearwardly projecting ends of the bars to prevent upward deflection of the rear portion of the belt during the raking operation.

11. A side delivery hay rake comprising a frame, an elongated endless flexible member having a plurality of raking teeth mounted thereon and projecting outwardly therefrom, rotatable drum members journalled on said frame and engaging the flexible member whereby the flexible member is provided with generally parallel upper and lower runs whereby the raking teeth will effectively rake the ground during lateral movement along the lower run, and means on said frame for engaging the flexible member along the bottom run thereof to prevent twisting of the flexible member about the longitudinal axis thereof.

12. The structure as defined in claim 11 together with drive means for said flexible member, said drive means being in the form of a flexible drive member received between the flexible member with the rake teeth thereon and one of the end drums for driving the flexible member with the rake teeth thereon.

References Cited by the Examiner

UNITED STATES PATENTS

| | | | |
|---|---|---|---|
| 395,132 | 12/1888 | Graham | 56—376 |
| 476,961 | 6/1892 | McPherson | 56—376 |
| 532,079 | 1/1895 | Mathwich | 56—376 |
| 554,794 | 2/1896 | Rex | 56—376 |
| 1,406,506 | 2/1922 | Stansberry | 56—376 |
| 2,605,599 | 8/1952 | Curry | 56—27 |
| 2,711,065 | 6/1955 | Orelind | 56—27 |
| 3,110,419 | 11/1963 | Atkins et al. | 198—203 X |

ABRAHAM G. STONE, *Primary Examiner.*

RUSSELL, R. KINSEY, ANTONIO F. GUIDA,
  *Examiners.*